(12) United States Patent
Sakazume

(10) Patent No.: US 9,480,089 B2
(45) Date of Patent: Oct. 25, 2016

(54) COMMUNICATION DEVICE, COMMUNICATION METHOD, AND PROGRAM FOR TRANSMITTING INFORMATION VIA A PLURALITY OF DIFFERENT NETWORKS

(71) Applicant: JVC KENWOOD Corporation, Yokohama-shi (JP)

(72) Inventor: Satoru Sakazume, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/704,644

(22) Filed: May 5, 2015

(65) Prior Publication Data

US 2015/0350939 A1   Dec. 3, 2015

(30) Foreign Application Priority Data

May 28, 2014   (JP) .................. 2014-110448

(51) Int. Cl.
*H04M 1/00* (2006.01)
*H04W 76/02* (2009.01)
*H04N 21/238* (2011.01)
*H04W 28/08* (2009.01)

(52) U.S. Cl.
CPC ........... *H04W 76/02* (2013.01); *H04N 21/238* (2013.01); *H04W 28/08* (2013.01)

(58) Field of Classification Search
CPC ... H04N 21/238; H04W 28/08; H04W 76/02
See application file for complete search history.

(56) References Cited

FOREIGN PATENT DOCUMENTS

JP   2003-209828 A   7/2003
JP   2004-297117 A   10/2004

*Primary Examiner* — Ping Hsieh
*Assistant Examiner* — Xin Jia
(74) *Attorney, Agent, or Firm* — Venable LLP; Michael A. Sartori

(57) ABSTRACT

A first measuring unit measures a first connection delay caused while a first communication unit shifts from a disconnected state to a connected state, and the first measuring unit also measures a second connection delay caused while a second communication unit shifts from a disconnected state to a connected state. A second measuring unit measures a first transmission delay caused while the first communication unit is in a connected state, and the second measuring unit also measures a second transmission delay caused while the second communication unit is in a connected state. A generating unit generates first information to be transmitted from the first communication unit and also generates second information to be transmitted from the second communication unit, based on the communication state of the first communication unit and the second communication unit.

11 Claims, 8 Drawing Sheets

| COMMUNICATION STATE | MEASUREMENT RESULTS TO BE USED |
|---|---|
| DISCONNECTED | FIRST CONNECTION DELAY AMOUNT AND SECOND CONNECTION DELAY AMOUNT |
| CONNECTED | FIRST TRANSMISSION DELAY AMOUNT AND SECOND TRANSMISSION DELAY AMOUNT |

| CONDITIONS | COMPRESSION RATIO OF FIRST INFORMATION | COMPRESSION RATIO OF SECOND INFORMATION |
|---|---|---|
| FIRST CONNECTION DELAY AMOUNT < SECOND CONNECTION DELAY AMOUNT | SMALL | LARGE |
| FIRST CONNECTION DELAY AMOUNT ≥ SECOND CONNECTION DELAY AMOUNT | LARGE | SMALL |

| CONDITIONS | COMPRESSION RATIO OF FIRST INFORMATION | COMPRESSION RATIO OF SECOND INFORMATION |
|---|---|---|
| FIRST TRANSMISSION DELAY AMOUNT < SECOND TRANSMISSION DELAY AMOUNT | SMALL | LARGE |
| FIRST TRANSMISSION DELAY AMOUNT ≧ SECOND TRANSMISSION DELAY AMOUNT | LARGE | SMALL |

42

COMMUNICATION DEVICE, COMMUNICATION METHOD, AND PROGRAM FOR TRANSMITTING INFORMATION VIA A PLURALITY OF DIFFERENT NETWORKS

CROSS-REFERENCE TO RELATED APPLICATION

This application is based upon and claims the benefit of priority from the prior Japanese Patent Application No. 2014-110448, filed on May 28, 2014, the entire contents of which are incorporated herein by reference.

BACKGROUND

1. Field

The present invention relates to a communication technique, and particularly to a communication device, a communication method, and a program for transmitting information via a plurality of different networks.

2. Description of the Related Art

In recent years, transmission capabilities of networks have been improved, so that there can be easily prepared an environment for transmitting a large volume of audio information or moving picture information with high quality. For example, it is proposed that, in order to efficiently use a server, moving picture data are distributed from a picture coding transmission device to client terminals via lines with different bandwidths (Patent Document 1, for example). It is also proposed a wireless communication system that is capable of distributing moving pictures with stable picture quality, even in an unstable condition as an environment for communication connection, such as wireless communication (Patent Document 2, for example).

[Patent Document 1] Japanese Patent Application Laid-open No. 2003-209828

[Patent Document 2] Japanese Patent Application Laid-open No. 2004-297117

In order to transmit information with a low delay from a sending device connected to multiple networks, processing should be performed based on a delay caused when information is transmitted to each network (hereinafter, referred to as a "transmission delay"). Meanwhile, at the time when information is transmitted from a sending device, the sending device may be connected to a network or may not be connected to any network. In the latter case, connection to a network is required before the transmission of information. In this case, a delay is caused when the sending device is connected to a network (hereinafter, referred to as a "connection delay"). With respect to a given network, the connection delay is not necessarily short even if the transmission delay in the network is short. Accordingly, control should be desirably provided based on whether or not the sending device is connected to a network.

SUMMARY

The present invention has been made in view of such a situation, and a purpose thereof is to provide a technique for providing control to shorten a delay, according to whether or not connection to a network is established.

To solve the problem above, a communication device according to an embodiment of the present invention comprises: a first communication unit that performs communication via a first network; a second communication unit that performs communication via a second network different from the first network via which the first communication unit performs communication; a first measuring unit that measures a first connection delay caused while the first communication unit shifts from a disconnected state to a connected state and that also measures a second connection delay caused while the second communication unit shifts from a disconnected state to a connected state; and a generating unit that generates first information to be transmitted from the first communication unit and also generates second information to be transmitted from the second communication unit on the basis of the communication state of the first communication unit and the second communication unit. The generating unit generates the first information and second information on the basis of the first connection delay measured by the first measuring unit when the communication state of the first communication unit and the second communication unit is a disconnected state.

Another embodiment of the present invention is also a communication device. The device comprises: a first communication unit that performs communication via a first network; a second communication unit that performs communication via a second network different from the first network via which the first communication unit performs communication; a second measuring unit that measures a first transmission delay caused while the first communication unit is in a connected state and that also measures a second transmission delay caused while the second communication unit is in a connected state; and a generating unit that generates first information to be transmitted from the first communication unit and also generates second information to be transmitted from the second communication unit on the basis of the communication state of the first communication unit and the second communication unit. The generating unit generates the first information and second information on the basis of the first transmission delay and the second transmission delay measured by the second measuring unit when the communication state of the first communication unit and the second communication unit is a connected state.

Yet another embodiment of the present invention is also a communication device. The device comprises: a first communication unit that performs communication via a first network; a second communication unit that performs communication via a second network different from the first network via which the first communication unit performs communication; a first measuring unit that measures a first connection delay caused while the first communication unit shifts from a disconnected state to a connected state and that also measures a second connection delay caused while the second communication unit shifts from a disconnected state to a connected state; a second measuring unit that measures a first transmission delay caused while the first communication unit is in a connected state and that also measures a second transmission delay caused while the second communication unit is in a connected state; and a generating unit that generates first information to be transmitted from the first communication unit and also generates second information to be transmitted from the second communication unit on the basis of the communication state of the first communication unit and the second communication unit. The generating unit generates the first information and second information on the basis of the first connection delay and the second connection delay measured by the first measuring unit when the communication state of the first communication unit and the second communication unit is a disconnected state, and the generating unit generates the first information and second information on the basis of the first transmission delay and the second transmission delay measured by the second measuring unit when the communication state of the first communication unit and the second communication unit is a connected state.

Optional combinations of the aforementioned constituting elements, and implementations of the present invention in the form of methods, apparatuses, systems, recording media, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 is a diagram that shows a data structure of a table stored in the control unit shown in FIG. 2;

FIG. 4 is a diagram that shows a data structure of another table stored in the control unit shown in FIG. 2;

FIG. 5 is a diagram that shows a data structure of yet another table stored in the control unit shown in FIG. 2;

DETAILED DESCRIPTION

Figure 1:
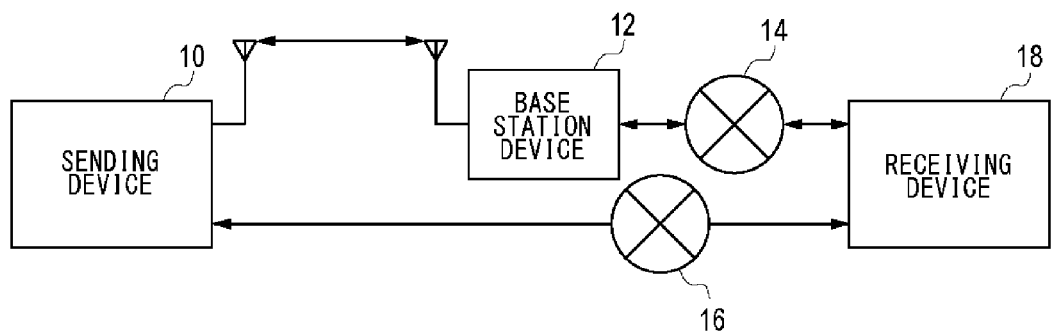
FIG. 1 is a diagram that shows a configuration of a communication system according to a first embodiment of the present invention.

The invention will now be described by reference to the preferred embodiments. This does not intend to limit the scope of the present invention, but to exemplify the invention.

First Embodiment

A general description will be given before the present invention is specifically described. The first embodiment of the present invention relates to a communication system comprising a sending device that transmits information, such as a picture and audio, to a receiving device via multiple networks. First, the situation on which the present embodiment is based will be described. For a network, Long Term Evolution (LTE), which is a standard for wireless communication, may be used. In the standard, the target connection delay is set to 100 ms, and the target transmission delay is set to 5 ms (one way); however, in a real commercial line, the connection delay may be several seconds, and the transmission delay may be about 30 to 200 ms. Also, in a commercial line using 3G, since the target values of the connection delay and transmission delay are not defined, there could be caused larger amounts of delays compared to the case of LTE, depending on the connection environment. Further, in a commonly-used Internet connection, a connection delay or a transmission delay of about several tens of milliseconds could be caused depending on the connection path. Thus, when multimedia information including a picture and audio is transmitted via a network using a commercial line, a connection delay or a transmission delay is caused because of the network configuration.

Such a connection delay or transmission delay could be fatal in a mission-critical environment. For example, a situation may occur where the first voice in an emergency is difficult to hear or where an image or audio of a current situation to be necessarily transmitted is lost. In a mission-critical environment, such a problem is handled by constructing a private communication system, so that a business-use wireless system, having certain communication quality and operated relatively easily, is introduced. In the United States, for example, a business-use radio system called Project 25 (P25 or APCO-25) defined by the Association of Public-Safety Communications Officials-International (APCO) is commonly used. However, a data transfer rate in P25 is substantially about 4 kbps, which is unsuitable for transmission of a vast amount of multimedia information. In LTE, on the other hand, since a current substantial data transfer rate is about 4 Mbps even in an uplink of a commercial line, a relatively large amount of moving picture information can also be transmitted.

In this way, characteristics including the connection delay, transmission delay, and data transfer rate are different for each network. Accordingly, pictures or audio should be desirably transmitted with a low delay using multiple networks. Also, as mentioned previously, control should be desirably provided based on whether or not connection to a network is established.

FIG. 1 shows a configuration of a communication system 100 according to the first embodiment of the present invention. The communication system 100 comprises a sending device 10, a base station device 12, a private network 14, the Internet 16, and a receiving device 18. The sending device 10 is connected so as to transmit, to the receiving device 18 via multiple networks, such as the Internet 16 and private network 14, information to be transmitted. The sending device 10 and the Internet 16, the Internet 16 and the receiving device 18, the sending device 10 and the base station device 12, the base station device 12 and the private network 14, and the private network 14 and the receiving device 18 are respectively connected by predetermined transmission media.

Such transmission media may be based on a wired system using lines as channels, such as cables, or may be based on a wireless system using no line, such as radio waves, light, and sound waves. Also, such transmission media may not be based on the same system. For example, Ethernet (registered trademark) cables may be used for a part of the transmission media, while radio waves are used for other transmission media. Further, the communication scheme of each transmission medium may also not be the same. For example, the transmission media on the Internet 16 side may be compatible with Ethernet, and the transmission media on the private network 14 side may be compatible with P25 or LTE. Alternatively, the transmission media on the Internet 16 side may be compatible with LTE while the transmission media on the private network 14 side are compatible with P25, so that all the transmission media use radio waves.

It is assumed here that the transmission media on the Internet 16 side are Ethernet cables, and the transmission media on the private network 14 side are compatible with P25. Accordingly, the base station device 12 is a wireless base station compatible with P25.

Figure 2:
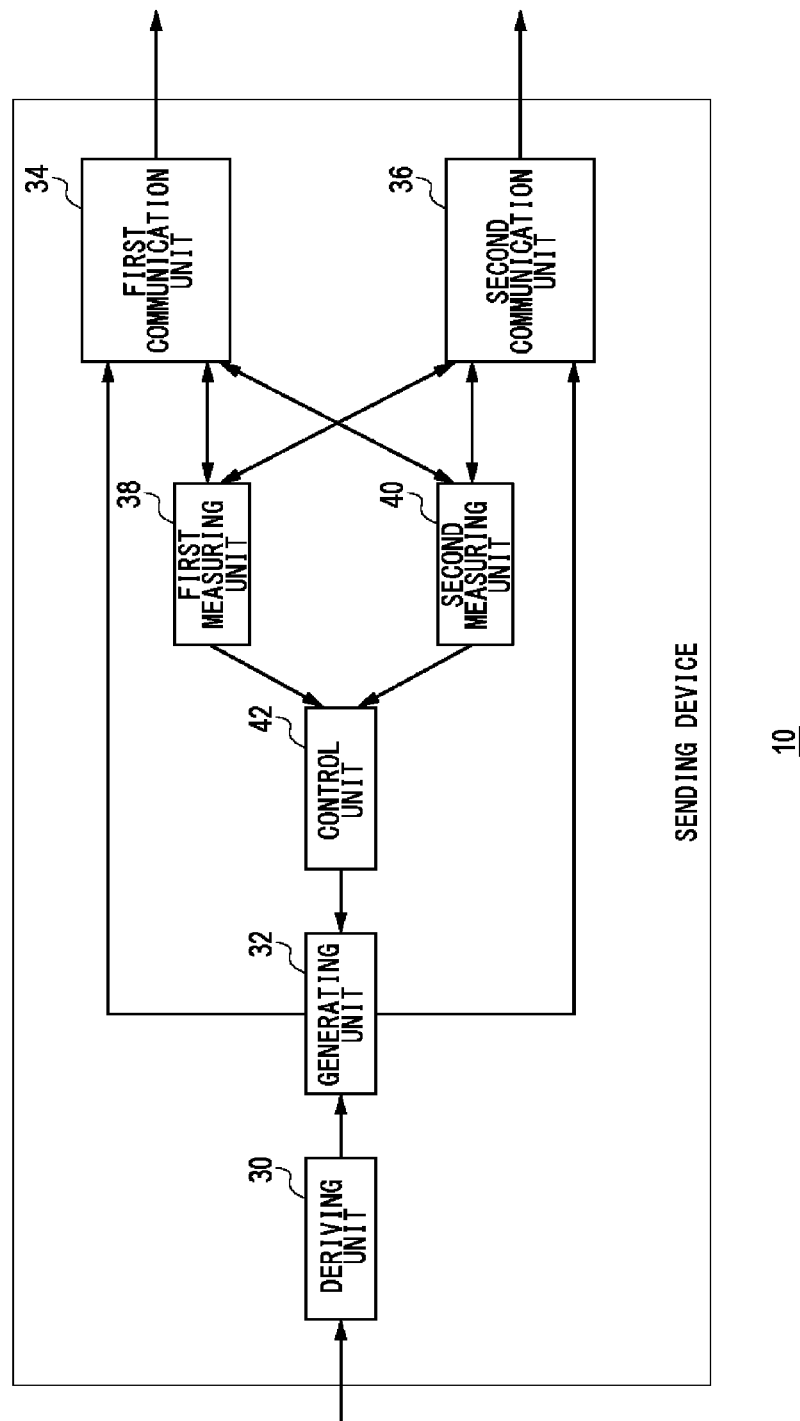
FIG. 2 is a diagram that shows a configuration of the sending device shown in FIG. 1.

FIG. 2 shows a configuration of the sending device 10. The sending device 10 comprises a deriving unit 30, a generating unit 32, a first communication unit 34, a second communication unit 36, a first measuring unit 38, a second measuring unit 40, and a control unit 42. The deriving unit 30 is connected to an imaging device, a transmission device, a recording device, a recording medium, a storage device, a sound collecting device, and the like, which are not illustrated, and derives a signal to be processed from at least one of the devices and medium. In the following, signals to be processed are assumed to be picture signals and audio signals, but the signals may be either picture signals or audio signals, or may be other signals. The deriving unit 30 supplies a derived signal to the generating unit 32.

The generating unit 32 derives a signal from the deriving unit 30. The generating unit 32 then generates first information and second information according to control provided by the control unit 42. The first information is information to be transmitted from the first communication unit 34, which will be described later, and the second information is information to be transmitted from the second communication unit 36, which will also be described later. The control unit 42 allows the generating unit 32 to supply the first information thus generated to the first communication unit 34 and to also supply the second information thus generated to the second communication unit 36. The details of the processing performed by the generating unit 32 will be described later.

The first communication unit 34 derives the first information from the generating unit 32. The first communication unit 34 is connected to the base station device 12 and private network 14 shown in FIG. 1 and transmits a signal including the first information to the receiving device 18 by performing communication appropriate for the base station device 12 and private network 14. Also, the first communication unit 34 may include a buffer for temporarily storing the first information and controlling timing for the transmission of the first information. Meanwhile, the second communication unit 36 derives the second information from the generating unit 32. The second communication unit 36 is connected to the Internet 16 and transmits a signal including the second information to the receiving device 18 by performing communication appropriate for the Internet 16. The second communication unit 36 may also include a buffer.

The first measuring unit 38 is connected to the first communication unit 34 and the second communication unit 36. The first measuring unit 38 measures the amount of connection delay between the sending device 10 and the receiving device 18 according to control provided by the control unit 42. The first measuring unit 38 measures, for example, time required to establish connection via a network between the sending device 10 and the receiving device 18 from the state where network connection is not established, i.e., the state where the network is disconnected, and defines the measured time as the connection delay amount. Namely, the connection delay is a delay caused during transition from a disconnected state to a connected state. The first measuring unit 38 measures a first connection delay amount via a network connected to the first communication unit 34 and also measures a second connection delay amount via a network connected to the second communication unit 36. The first measuring unit 38 then outputs the first connection delay amount and the second connection delay amount to the control unit 42.

The second measuring unit 40 is also connected to the first communication unit 34 and the second communication unit 36. The second measuring unit 40 measures the amount of transmission delay between the sending device 10 and the receiving device 18 according to control provided by the control unit 42. The second measuring unit 40 measures, for example, time from when a given unit of information is transmitted in the state where network connection is established between the sending device 10 and the receiving device 18 until when the reception of the information is acknowledged, and defines the measured time as the transmission delay amount. Namely, the transmission delay is a delay caused during a connected state. The second measuring unit 40 measures a first transmission delay amount via a network connected to the first communication unit 34 and also measures a second transmission delay amount via a network connected to the second communication unit 36. The second measuring unit 40 then outputs the first transmission delay amount and the second transmission delay amount to the control unit 42.

The first measuring unit 38 and the second measuring unit 40 perform measurement before the generation of information to be transmitted. The timing of measurement by the first measuring unit 38 and the second measuring unit 40 is not particularly limited, as long as it is before the generating unit 32 generates the first information and the second information. For example, measurement may be performed after the generating unit 32 derives a signal to be transmitted. Also, measurement may be performed before the transmission process of information is started or when the sending device 10 is started up.

The control unit 42 manages the operating state of the sending device 10 and controls the operation of each component included in the sending device 10 and transmission and reception of information output from and input to each component. The control unit 42 also derives the first connection delay amount and the second connection delay amount from the first measuring unit 38 and also derives the first transmission delay amount and the second transmission delay amount from the second measuring unit 40. The control unit 42 may then compare the first connection delay amount and the second connection delay amount and may define the shorter amount as a shorter connection delay amount and define the longer amount as a longer connection delay amount. Similarly, the control unit 42 may compare the first transmission delay amount and the second transmission delay amount and may define the shorter amount as a shorter transmission delay amount and define the longer amount as a longer transmission delay amount.

The control unit 42 derives the communication state of the first communication unit 34 and the second communication unit 36. The communication state here means either a connected state or a disconnected state. Based on the derived communication state, the control unit 42 selects a parameter used for the generation of the first information and the second information, among the first connection delay amount, second connection delay amount, first transmission delay amount, and second transmission delay amount. This selecting process is now described using FIG. 3. FIG. 3 shows a data structure of a table stored in the control unit 42. As shown in FIG. 3, correspondence relationships between the communication state and measurement results to be used are provided. When the communication state of the first communication unit 34 and second communication unit 36 is a disconnected state, the control unit 42 selects the first connection delay amount and the second connection delay amount. When the communication state of the first communication unit 34 and second communication unit 36 is a connected state, on the other hand, the control unit 42 selects the first transmission delay amount and the second transmission delay amount. Accordingly, when the communication state is shifted from a disconnected state to a connected state, the upper part of FIG. 3 is selected in the initial period, and the lower part thereof is selected in the subsequent period. The description will now return to FIG. 2.

When the control unit 42 has selected the first connection delay amount and the second connection delay amount, the control unit 42 allows the generating unit 32 to generate the first information and the second information according to FIG. 4. FIG. 4 shows a data structure of another table stored in the control unit 42. When the first connection delay amount is shorter than the second connection delay amount, the control unit 42 allows the generating unit 32 to generate the first information with a smaller compression ratio and to generate the second information with a larger compression ratio. On the other hand, when the first connection delay amount is not shorter than the second connection delay amount, the control unit 42 allows the generating unit 32 to generate the first information with a larger compression ratio and to generate the second information with a smaller compression ratio. Namely, the control unit 42 allows the generating unit 32 to generate the first information so that the process delay on the reception side becomes shorter in the case where the first connection delay amount is shorter than the second connection delay amount, compared to in the case where the first connection delay amount is longer than the second connection delay amount. The description will now return to FIG. 2.

When the control unit 42 has selected the first transmission delay amount and the second transmission delay amount, the control unit 42 allows the generating unit 32 to generate the first information and the second information according to FIG. 5. FIG. 5 shows a data structure of yet another table stored in the control unit 42. When the first transmission delay amount is shorter than the second transmission delay amount, the control unit 42 allows the generating unit 32 to generate the first information with a smaller compression ratio and to generate the second information with a larger compression ratio. On the other hand, when the first transmission delay amount is not shorter than the second transmission delay amount, the control unit 42 allows the generating unit 32 to generate the first information with a larger compression ratio and to generate the second information with a smaller compression ratio. Namely, the control unit 42 allows the generating unit 32 to generate the first information so that the process delay on the reception side becomes shorter in the case where the first transmission delay amount is shorter than the second transmission delay amount, compared to in the case where the first transmission delay amount is longer than the second transmission delay amount. The description will now return to FIG. 2. In this way, the control unit 42 allows the generating unit 32 to generate the first information and second information based on the communication state of the first communication unit 34 and second communication unit 36.

There will now be described information generated in the generating unit 32 and corresponding to a shorter connection delay amount. The generating unit 32 includes a predetermined coding means and may generate information corresponding to a shorter connection delay amount so that the information has a predetermined code amount. When the signal to be transmitted is picture information or moving picture information, the predetermined coding means may be compatible with picture coding standards standardized by ISO/IEC and ITU-T, such as Joint Photographic Experts Group (JPEG) and JPEG2000, or with moving picture coding standards as represented by Advanced Video Coding (AVC) and High Efficiency Video Coding (HEVC). Also, the coding means may employ another coding method used in picture transmission or moving picture transmission. When the signal to be transmitted is an acoustic signal, the predetermined coding means may be compatible with audio coding standards standardized by ISO/IEC or the like, as represented by MPEG Audio Layer-3 (MP3) and Advanced Audio Coding (AAC), or may employ another audio coding method, such as waveform coding including Pulse Code Modulation (PCM), Adaptive Differential Pulse Code Modulation (ADPCM), delta modulation, transform coding, and sub-band coding, hybrid coding including Code Excited Linear Prediction (CELP), analysis-synthesis coding including an LPC vocoder, and vector quantization.

In the present embodiment, information corresponding to a shorter connection delay amount is coded, for example, so that time required for decoding (hereinafter, referred to as "decoding time") of the information is equal to or shorter than the decoding time of information corresponding to a longer connection delay amount. In order to reduce the decoding time, when the signal information to be transmitted is picture information or moving picture information, at least one of reducing the spatial resolution of a picture, reducing the bit depth of each sample of a picture, reducing the frame rate, and reducing the information amount in the time direction is performed. Also, when the signal information to be transmitted is acoustic signal information, at least one of reducing the sampling rate of audio signal information and roughly quantizing each signal sample of audio signal information is performed.

Also, in order to reduce the decoding time, the predetermined coding means having high throughput may be used to improve the coding efficiency, on the premise that a predetermined decoding means capable of processing a large amount of information at high speed is used to decode information corresponding to a shorter connection delay amount, for example. Accordingly, the decoding time is reduced, and the amount of information to be transmitted is also reduced. With such processing, information can be transmitted in a shorter time using a network through which transmission can be performed with a low delay. Therefore, even when information needs to be instantly transmitted, the information can be transmitted or received in a shorter time.

Further, a predetermined coding process may be performed so that the decoding time becomes minimum, while at least the transmission rate is maximally kept in a connected network. Also, information may be set to have a predetermined code amount. Accordingly, even when information needs to be instantly transmitted, the information can be transmitted or received in a shorter time while as large an amount of information as possible is transmitted.

There will now be described information generated in the generating unit 32 and corresponding to a longer connection delay amount. Information corresponding to a longer connection delay amount may be coded so that the information amount at the time of decoding becomes larger compared to the case of information corresponding to a shorter connection delay amount. Since the information amount at the time of decoding is larger, the code amount of information corresponding to a longer connection delay amount is also generally larger. In order to increase the information amount at the time of decoding, when the signal information to be transmitted is picture information or moving picture information, at least one of increasing the spatial resolution of a picture, increasing the bit depth of each sample of a picture, increasing the frame rate, and increasing the information amount in the time direction is performed, compared to the case of information corresponding to a shorter connection delay amount. Also, when the signal information to be transmitted is acoustic signal information, at least one of increasing the sampling rate of audio signal information and finely quantizing each signal sample of audio signal information is performed. Accordingly, information corresponding to a longer connection delay amount can be generated so as to be appropriate for a network causing a large delay. By using such information corresponding to a longer connection delay amount, although delay is large, transmission information having a sufficient information amount can be efficiently transmitted.

Further, a predetermined coding process may be performed so that the transmittable information amount becomes maximum, while at least the transmission rate is maximally kept in a connected network. Also, information may be set to have a predetermined code amount. Accordingly, transmission information having a larger information amount can be efficiently transmitted.

Also, a shorter connection delay amount may be subtracted from a longer connection delay amount to derive a difference connection delay amount, and the difference connection delay amount may be reflected in a predetermined coding process. For example, the predetermined coding process may be performed from a picture delayed by a difference connection delay amount from the first intra picture. Alternatively, the predetermined coding process may be performed from a picture delayed by a time shorter than the difference connection delay amount, in consideration of a margin. Consequently, a portion to be played as information corresponding to a shorter connection delay amount is excluded from information corresponding to a longer connection delay amount, so that information after the portion to be played as information corresponding to the shorter connection delay amount can be generated to have a larger information amount. Therefore, transmission information having a larger information amount can be efficiently transmitted.

Information corresponding to a shorter transmission delay amount may be generated in the same way as the information corresponding to a shorter connection delay amount. Also, information corresponding to a longer transmission delay amount may be generated in the same way as the information corresponding to a longer connection delay amount.

Figure 6:
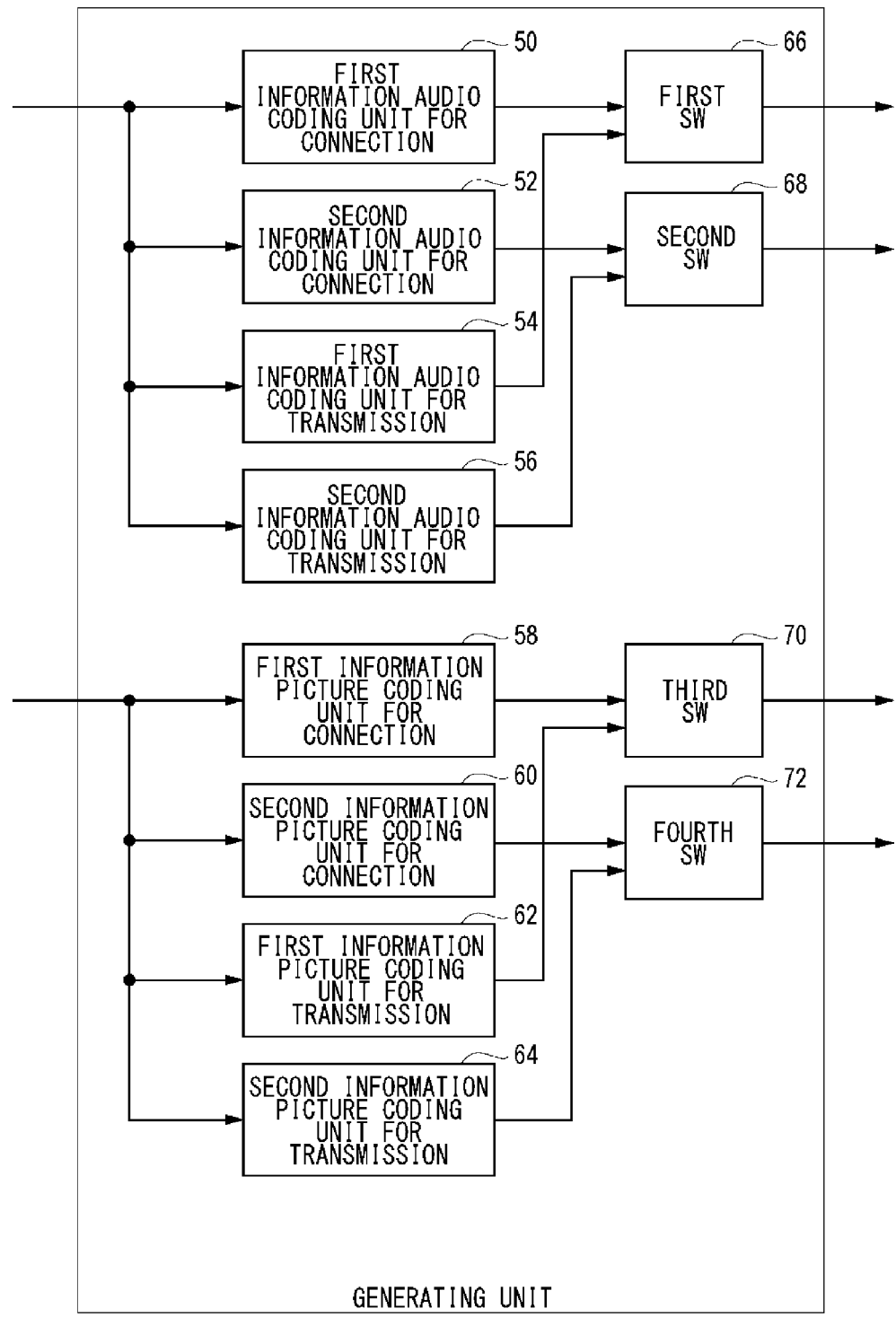
FIG. 6 is a diagram that shows a configuration of the generating unit shown in FIG. 2.

FIG. 6 shows a configuration of the generating unit 32. The generating unit 32 comprises a first information audio coding unit 50 for connection, a second information audio coding unit 52 for connection, a first information audio coding unit 54 for transmission, a second information audio coding unit 56 for transmission, a first information picture coding unit 58 for connection, a second information picture coding unit 60 for connection, a first information picture coding unit 62 for transmission, a second information picture coding unit 64 for transmission, a first SW 66, a second SW 68, a third SW 70, and a fourth SW 72.

The generating unit 32 performs a predetermined coding process on input audio information at the first information audio coding unit 50 for connection, second information audio coding unit 52 for connection, first information audio coding unit 54 for transmission, and second information audio coding unit 56 for transmission. Accordingly, the first information and second information is generated. The first SW 66 selects and outputs the first information supplied from the first information audio coding unit 50 for connection when the communication state is a disconnected state, and selects and outputs the first information supplied from the first information audio coding unit 54 for transmission when the communication state is a connected state. Similarly, the second SW 68 selects and outputs the second information supplied from the second information audio coding unit 52 for connection when the communication state is a disconnected state, and selects and outputs the second information supplied from the second information audio coding unit 56 for transmission when the communication state is a connected state. The first information picture coding unit 58 for connection through the second information picture coding unit 64 for transmission, the third SW 70, and the fourth SW 72 perform similar processing on picture information, similarly to the first information audio coding unit 50 for connection through the second information audio coding unit 56 for transmission, the first SW 66, and the second SW 68.

The configuration described above may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

Figure 7:
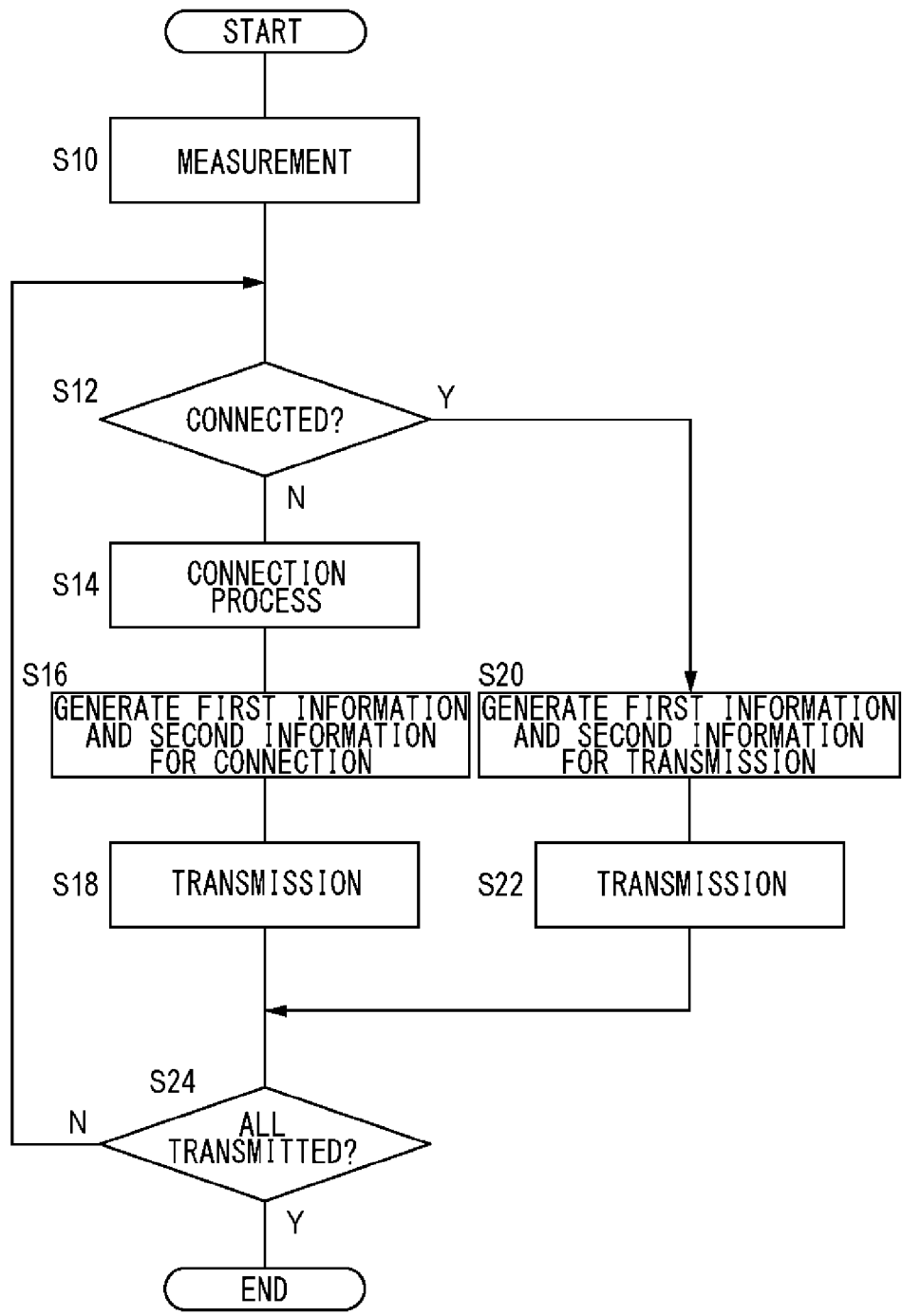
FIG. 7 is a flowchart that shows a transmission procedure performed by the communication system shown in FIG. 1.

There will now be described an operation performed by the communication system 100 having the configuration set forth above. FIG. 7 is a flowchart that shows a transmission procedure performed by the communication system 100. Specifically, upon detection of a request given to the sending device 10 to start information transmission, the control unit 42 issues an instruction for starting information transmission to each component included in the sending device 10. In order to measure the connection delay amount and the transmission delay amount of each network to which the sending device 10 is connected, the control unit 42 instructs the first measuring unit 38 and the second measuring unit 40 to start measurement. In accordance with the instruction from the control unit 42, the first measuring unit 38 and second measuring unit 40 perform measurement (S10).

When connection is not established (N at S12), the control unit 42 instructs the first communication unit 34 and the second communication unit 36 to establish network connection. In accordance with control provided by the control unit 42, the first communication unit 34 and second communication unit 36 establish network connection by performing a predetermined network connection process (S14). Thereafter, the control unit 42 instructs the generating unit 32 to generate first information and second information for connection. The generating unit 32 then generates the first information and second information for connection according to control provided by the control unit 42 (S16). Further, the control unit 42 instructs the first communication unit 34 to transmit the first information and instructs the second communication unit 36 to transmit the second information. Accordingly, the first communication unit 34 transmits the first information and the second communication unit 36 transmits the second information (S18).

When connection is already established (Y at S12), the control unit 42 instructs the generating unit 32 to generate first information and second information for transmission. The generating unit 32 then generates the first information and second information for transmission according to control provided by the control unit 42 (S20). Thereafter, the control unit 42 instructs the first communication unit 34 to transmit the first information and instructs the second communication unit 36 to transmit the second information. Accordingly, the first communication unit 34 transmits the first information and the second communication unit 36 transmits the second information (S22). When the process of transmitting a predetermined transmission unit of information is completed, the control unit 42 determines if all the information to be transmitted has been actually transmitted (S24). If all the information has not been transmitted (N at S24), the process will return to the step S12. If all the information has been transmitted (Y at S24), the process will terminate.

According to the present embodiment, a connection delay and a transmission delay are measured and either one of them is selected according to the communication state, and the first information and second information is generated based on the selected delay; accordingly, control can be provided so as to shorten the delay according to whether or not connection to a network is established. Also, when the first information and second information is transmitted, information generated for a lower delay is supplied to a network of which the delay amount is smaller; accordingly, information can be transmitted with the least missing information, using a network of which the transmission delay is shorter. Further, information generated by advanced information compression is supplied to a network of which the delay amount is larger, so that a detailed signal having a larger information amount can be transmitted.

In the decoding process, even when a detailed signal having a larger information amount cannot be derived, a signal having certain quality can be derived from the transmission information generated for a lower delay. Also, the situations where the first voice in an emergency is difficult to hear and where an image or audio of a current situation to be necessarily transmitted is lost can be prevented. Since the connection delay and transmission delay are measured prior to the generation of information to be transmitted, the process delay caused during the time from the generation of the information to be transmitted to the transmission of the information can be reduced. Also, since multiple networks are used, transmission of a vast amount of information to be transmitted is enabled with a smaller connection delay and a smaller transmission delay. Further, in a mission-critical application, desired information can be transmitted and received more instantly and safely while missing information is minimized.

Second Embodiment

Next, the second embodiment will be described. As with the first embodiment, the second embodiment also relates to a communication system that transmits information from a sending device to a receiving device via multiple networks. In comparison with the first embodiment, the timing for measuring the connection delay amount and the process delay amount is different in the second embodiment. The communication system 100 according to the second embodiment is of a similar type to the communication system 100 shown in FIG. 1, and the sending device 10 according to the second embodiment is of a similar type to the sending device 10 shown in FIG. 2. Accordingly, a description will be given mainly of the differences from the first embodiment.

The first measuring unit 38 and the second measuring unit 40 perform measurement when information to be transmitted is generated. Namely, the measuring process is occasionally performed at the stage where a delay amount is required.

Figure 8:
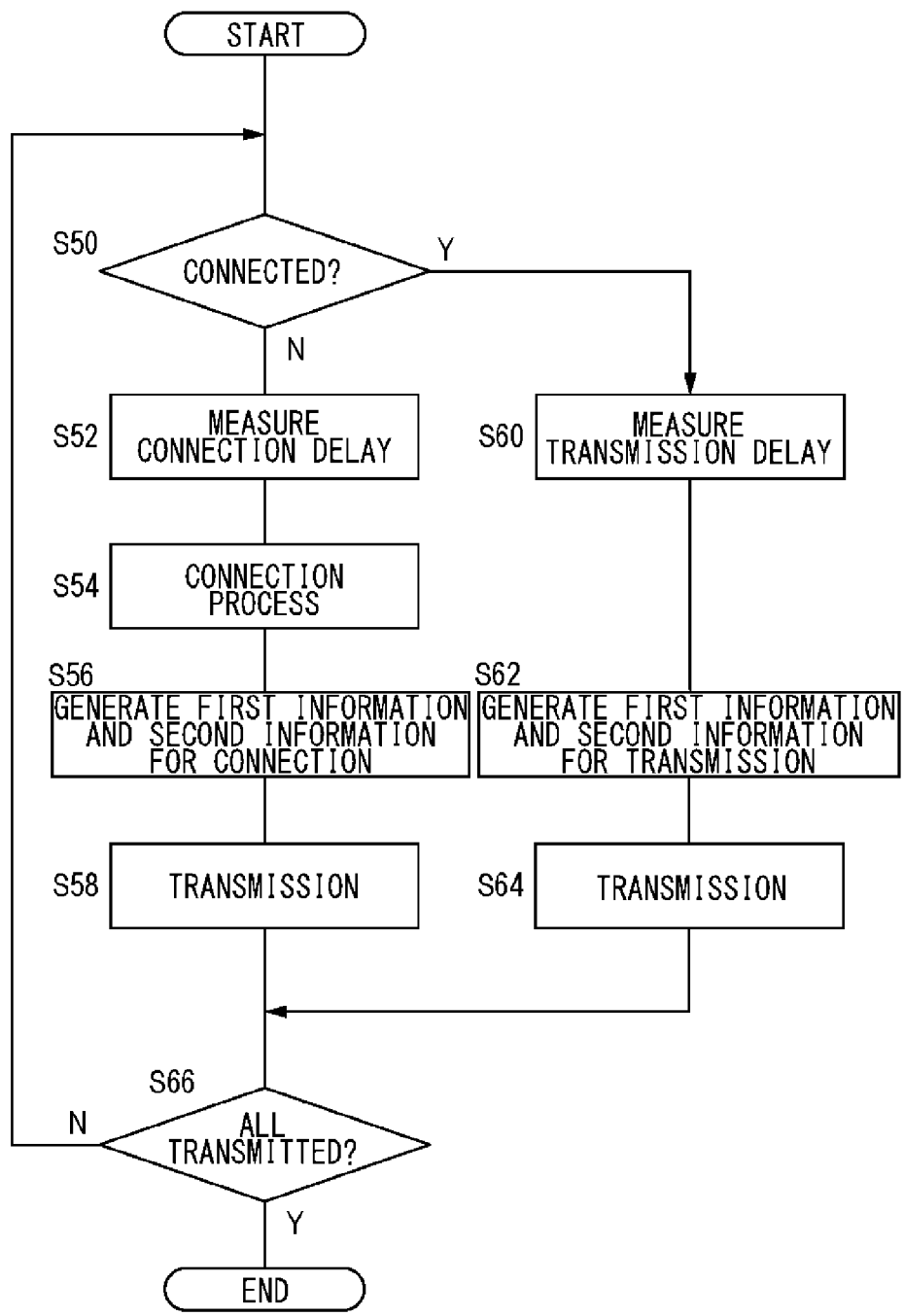
FIG. 8 is a flowchart that shows a transmission procedure performed by a communication system according to a second embodiment of the present invention.

FIG. 8 is a flowchart that shows a transmission procedure performed by the communication system 100 according to the second embodiment of the present invention. Upon detection of a request given to the sending device 10 to start information transmission, the control unit 42 first checks if network connection is established (S50). When connection is not established (N at S50), the first measuring unit 38 measures the first connection delay amount and the second connection delay amount according to control provided by the control unit 42 (S52). Thereafter, the control unit 42 instructs the first communication unit 34 and the second communication unit 36 to establish network connection. In accordance with control provided by the control unit 42, the first communication unit 34 and second communication unit 36 establish network connection by performing a predetermined network connection process (S54). Also, the control unit 42 instructs the generating unit 32 to generate the first information and second information for connection. The generating unit 32 then generates the first information and second information for connection according to control provided by the control unit 42 (S56). Further, the control unit 42 instructs the first communication unit 34 to transmit the first information and instructs the second communication unit 36 to transmit the second information. Accordingly, the first communication unit 34 transmits the first information and the second communication unit 36 transmits the second information (S58).

When connection is already established (Y at S50), the control unit 42 instructs the second measuring unit 40 to start measurement. The second measuring unit 40 then measures the first transmission delay amount and the second transmission delay amount according to control provided by the control unit 42 (S60). Thereafter, the control unit 42 instructs the generating unit 32 to generate the first information and second information for transmission. The generating unit 32 then generates the first information and second information for transmission according to control provided by the control unit 42 (S62). Further, the control unit 42 instructs the first communication unit 34 to transmit the first information and instructs the second communication unit 36 to transmit the second information. Accordingly, the first communication unit 34 transmits the first information and the second communication unit 36 transmits the second information (S64). When the process of transmitting a predetermined transmission unit of information is completed, the control unit 42 determines if all the information to be transmitted has been actually transmitted (S66). If all the information has not been transmitted (N at S66), the process will return to the step S50. If all the information has been transmitted (Y at S66), the process will terminate.

According to the present embodiment, the connection delay amount and transmission delay amount are measured each time the process of transmitting a predetermined transmission unit of information is performed, and transmission information generated for a lower delay is supplied to a network of which the delay amount is smaller; accordingly, information can be transmitted according to the latest connection delay amount and transmission delay amount.

The present invention has been described with reference to the embodiments. The embodiments are intended to be illustrative only, and it will be obvious to those skilled in the art that various modifications to a combination of constituting elements or processes could be developed and that such modifications also fall within the scope of the present invention.

In the first and second embodiments of the present invention, the sending device 10 does not perform electric power control. However, the application is not limited to the case, and, for example, the control unit 42 may control the operating state of the first communication unit 34 and second communication unit 36 and may control electric power to be supplied by turning off the power or placing the power supply in a standby state while transmission information is not transmitted. As a result, power consumption in the first communication unit 34 and second communication unit 36 can be reduced. According to this modification, since information is transmitted to multiple networks, power consumption can be reduced compared to the case where information is transmitted to a particular network. Also, since the power supply is turned off or placed in a standby state while information is not transmitted, transmission using multiple networks can be performed using the reduced amount of power consumption.

What is claimed is:

1. A communication device, comprising:
a first communication unit that performs communication via a first network;
a second communication unit that performs communication via a second network different from the first network via which the first communication unit performs communication;
a first measuring unit that measures a first connection delay caused while the first communication unit shifts from a disconnected state to a connected state and that also measures a second connection delay caused while the second communication unit shifts from a disconnected state to a connected state; and
a generating unit that generates first information to be transmitted from the first communication unit and also generates second information to be transmitted from the second communication unit on the basis of the communication state of the first communication unit and the second communication unit, wherein
the generating unit generates the first information and second information on the basis of the first connection delay measured by the first measuring unit when the communication state of the first communication unit and the second communication unit is a disconnected state.

2. The communication device of claim 1, wherein the generating unit generates the first information so that the process delay on the reception side becomes shorter in the case where the first connection delay is shorter than the second connection delay, compared to in the case where the first connection delay is longer than or equal to the second connection delay.

3. The communication device of claim 1, wherein the first measuring unit performs measurement prior to the generation of information to be transmitted.

4. A communication device, comprising:
a first communication unit that performs communication via a first network;
a second communication unit that performs communication via a second network different from the first network via which the first communication unit performs communication;
a second measuring unit that measures a first transmission delay caused while the first communication unit is in a connected state and that also measures a second transmission delay caused while the second communication unit is in a connected state; and
a generating unit that generates first information to be transmitted from the first communication unit and also generates second information to be transmitted from the second communication unit on the basis of the communication state of the first communication unit and the second communication unit, wherein
the generating unit generates the first information and second information on the basis of the first transmission delay and the second transmission delay measured by the second measuring unit when the communication state of the first communication unit and the second communication unit is a connected state.

5. The communication device of claim 4, wherein the generating unit generates the first information so that the process delay on the reception side becomes shorter in the case where the first transmission delay is shorter than the second transmission delay, compared to in the case where the first transmission delay is longer than or equal to the second transmission delay.

6. The communication device of claim 4, wherein the second measuring unit performs measurement prior to the generation of information to be transmitted.

7. A communication device, comprising:
a first communication unit that performs communication via a first network;
a second communication unit that performs communication via a second network different from the first network via which the first communication unit performs communication;
a first measuring unit that measures a first connection delay caused while the first communication unit shifts from a disconnected state to a connected state and that also measures a second connection delay caused while the second communication unit shifts from a disconnected state to a connected state;
a second measuring unit that measures a first transmission delay caused while the first communication unit is in a connected state and that also measures a second transmission delay caused while the second communication unit is in a connected state; and
a generating unit that generates first information to be transmitted from the first communication unit and also generates second information to be transmitted from the second communication unit on the basis of the communication state of the first communication unit and the second communication unit, wherein:
the generating unit generates the first information and second information on the basis of the first connection delay and the second connection delay measured by the first measuring unit when the communication state of the first communication unit and the second communication unit is a disconnected state; and
the generating unit generates the first information and second information on the basis of the first transmission delay and the second transmission delay measured by the second measuring unit when the communication state of the first communication unit and the second communication unit is a connected state.

8. The communication device of claim 7, wherein the generating unit generates the first information so that the process delay on the reception side becomes shorter in the case where the first connection delay is shorter than the second connection delay, compared to in the case where the first connection delay is longer than or equal to the second connection delay.

9. The communication device of claim 7, wherein the generating unit generates the first information so that the process delay on the reception side becomes shorter in the case where the first transmission delay is shorter than the second transmission delay, compared to in the case where the first transmission delay is longer than or equal to the second transmission delay.

10. The communication device of claim 7, wherein the first measuring unit and the second measuring unit perform measurement prior to the generation of information to be transmitted.

11. The communication device of claim 7, wherein the first measuring unit and the second measuring unit perform measurement when information to be transmitted is generated.

* * * * *